(12) United States Patent
Faffelberger

(10) Patent No.: US 9,039,260 B2
(45) Date of Patent: May 26, 2015

(54) LIGHTGUIDE ELEMENT

(71) Applicant: Zizala Lichtsysteme GmbH, Wieselburg (AT)

(72) Inventor: Anton Faffelberger, Krummnussbaum (AT)

(73) Assignee: ZIZALA LICHTSYSTEME GMBH, Wieselburg (AU)

( * ) Notice: Subject to any disclaimer, the term of this patent is extended or adjusted under 35 U.S.C. 154(b) by 205 days.

(21) Appl. No.: 13/670,048

(22) Filed: Nov. 6, 2012

(65) Prior Publication Data

US 2013/0114277 A1     May 9, 2013

(30) Foreign Application Priority Data

Nov. 8, 2011 (AT) .................................. 1653/2011

(51) Int. Cl.
| | | |
|---|---|---|
| *G02B 6/00* | (2006.01) | |
| *F21V 8/00* | (2006.01) | |
| *B60Q 1/04* | (2006.01) | |
| *F21S 8/10* | (2006.01) | |

(52) U.S. Cl.
CPC ............... *G02B 6/0001* (2013.01); *B60Q 1/04* (2013.01); *F21S 48/115* (2013.01); *F21S 48/1241* (2013.01); *F21S 48/215* (2013.01); *F21S 48/225* (2013.01); *F21S 48/2262* (2013.01); *F21S 48/2287* (2013.01)

(58) Field of Classification Search
CPC ............... B60Q 1/0011; F21S 48/1241; F21S 48/2225; F21S 48/2231; F21S 48/2237; F21S 48/2243; F21S 48/225; G02B 6/0033–6/0036; G02B 6/0038; G02B 6/0045–6/0046; G02B 6/0048; G02B 6/0058; G02B 6/0073

USPC ......... 362/558, 509, 520–522, 602, 555, 610, 362/36, 43, 146, 619
See application file for complete search history.

(56) References Cited

U.S. PATENT DOCUMENTS

| | | | |
|---|---|---|---|
| 4,289,698 A | * | 9/1981 | Stepp ............................ 540/138 |
| 5,927,850 A | | 7/1999 | Osada |
| 7,431,481 B2 | * | 10/2008 | Stefanov ....................... 362/328 |

(Continued)

FOREIGN PATENT DOCUMENTS

| | | |
|---|---|---|
| EP | 1895228 A1 | 3/2008 |
| EP | 2479486 A2 | 1/2012 |

OTHER PUBLICATIONS

Austrian Patent Office Action for Austrian Application No. 1653/2011 mailed Sep. 5, 2012 (3 pages).

*Primary Examiner* — Julie Bannan
(74) *Attorney, Agent, or Firm* — Sutherland Asbill & Brennan LLP

(57) ABSTRACT

This disclosure concerns a lightguide element (1) for a light unit or an automotive headlight, wherein the light element (1) has at least one light input area (2) for putting in light with at least one light source and the lightguide element (1) furthermore has at least one light output area (3) for putting out the light, wherein a beam splitting area (4) is arranged next to the light input area (2), from which at least one first lightguide part (5) and at least one second lightguide part (6) travel in directions leading away from each other, and a lightguiding connection element (7) is arranged in the area spanned by the lightguide parts (5, 6), which transitions into the light output area (3) on its side facing away from the lightguide parts. The lightguide parts have optical structuring elements (8) on their side facing away from the light output area.

21 Claims, 3 Drawing Sheets

(56) References Cited

U.S. PATENT DOCUMENTS

| | | | |
|---|---|---|---|
| 2005/0168987 A1* | 8/2005 | Tamaoki et al. | 362/244 |
| 2009/0135623 A1* | 5/2009 | Kunimochi | 362/608 |
| 2010/0165241 A1* | 7/2010 | Kim et al. | 349/61 |
| 2014/0211125 A1* | 7/2014 | Kurata | 349/65 |

* cited by examiner

LIGHTGUIDE ELEMENT

The invention concerns a lightguide element for a lamp unit or an automotive headlight, wherein the lamp element has at least one light input area for putting in light with at least one light source and the lightguide element furthermore has at least one light output area for putting out the light. The invention moreover concerns a lamp unit or an automotive headlight with at least one light source with such a lightguide element.

BACKGROUND

Various kinds of lightguide elements are known for focusing of light. The light from one or more light sources, such a light-emitting diodes (LED), halogen, xenon or discharge lamps is put into the lightguide element in the light input area and then gets to the light output area in various ways. The light emerging there then creates a light function, such as a position light, a daytime running light (DRL), or a blinking light.

AT 009 091 U1 shows a lightguide element with a light input area and a light output area, wherein lightguide rods are provided between the areas that expand in fanlike manner and have different cross sections. The light rods here are configured as recesses in the lightguide element.

EP 1895228 A1 shows a device with three zones, wherein the first zone serves for putting in the light, the second zone uniformly distributes the light and in the third zone the light emerges once more. Corresponding optical elements in the second zone provide for a uniform luminance.

WO 2011/021135 A1 shows a lens arrangement for a lighting source, opening out like a pot and consisting of striplike lightguide elements. The light of one lighting source—such as an LED—is distributed via the lightguide elements in the direction of a platelike light exit surface.

DE 698 33 421 T2 describes a light output optics for automotive signal lamps that comprises a plate of material nontransparent to light, in which openings with concave and convex surfaces are made, functioning as cylindrical lenses and enabling a uniform light distribution across the nontransparent plate.

The drawback to these known solutions, in particular, is that the light exiting via the light output optics is usually distributed inhomogeneously for structural reasons, which is especially the case when using light sources with very pronounced main beam direction, such as LEDs, and this is undesirable. As a result, the light exiting through the light output area has nonuniform brightness or the light source is shown prominently.

Often the known lightguide elements can be made only with difficulty by economical injection molding methods, since the small-sized recesses and openings in the mold separation area can cause burr, resulting in substantial light losses. Accordingly, the tools and dies are relatively expensive in the manufacture and operation (maintenance expenses).

It is therefore one problem of the invention to provide a lightguide element that produces a uniform light distribution regardless of the light source used.

SUMMARY

This problem is solved according to the invention, with a lightguide element of the kind mentioned in the outset, in that a beam splitting area is arranged between the light input and the light output area, where the part of the lightguide element coming from the light input area is divided into at least one first lightguide part and at least one second lightguide part, which travel in directions leading away from each other, wherein a lightguiding connection element is arranged in the area spanned by the lightguide parts, which transitions into the light output area on its side facing away from the lightguide parts, and the lightguide parts have optical structuring elements on their side facing away from the light output area, while substrands are provided in the connection element that arise from the lightguide parts and emerge into the light output area.

The lightguide element according to the invention enables a uniform luminous density regardless of the light source used, since the input to the connection element does not occur directly, but across the lightguide parts. Furthermore, the quantity of light emerging in the light coupling area can be optimally adapted by appropriate configuration of the connection element, and the radiating characteristics of the particular light source can be taken into account. The optical structuring elements divert the incoming light into the lightguide rods or grooves in the connection element and thereby support a homogeneous light distribution. The light output area is advantageously streamlined with a smooth surface, making it possible for a homogenization of the light to occur already in the lightguide element thanks to the solution of the invention. Of course, however, the surface of the light output area can have any desired configuration, such as a structured one.

The lightguide element of the invention enables one to fulfill the rules of law applying to automotive parts, such as ECE, SAE and CCC, and it has an especially homogeneous light distribution. By homogeneous is meant here a light distribution with no abrupt intensity changes. However, it is not necessary for the emitted light to have the same intensity everywhere; for example, the light distribution can have a maximum in the middle and an intensity tapering off toward the outer regions.

In one variant of the invention, at least one bifurcation element is provided in the beam splitting area at the place from which the lightguide parts proceed. The bifurcation element is advantageously optically thinner than the rest of the lightguide element. For example, the bifurcation element can be configured as a heavily thinned-out place of the lightguide element or one made from air, i.e., an opening or pierced location. The bifurcation element serves to ensure the most complete possible diverting of the incoming light into the lightguide parts. Furthermore, the bifurcation element serves to prevent the light source from being seen as a direct spot in the outgoing light distribution.

In one variant of the invention, the cross sections of the substrands are configured with different diameters. For example, the diameters can increase or decrease in one direction. In this way, the intensity distribution of the outgoing light can be additionally shaped. The substrands, for example, can be configured as lightguide rods and/or as lightguide grooves. Through the substrands, the incoming light can be led into the light output area. The orientation of the lightguide rods or lightguide grooves dictates the main beam direction of the overall lightguide element. The lightguide rods can be fabricated separately, structured by openings, or made by injection molding. The grooves can be stamped or opened up after fabrication or be fabricated directly during the injection molding. Accordingly, the substrands can also be joined to each other, which is immediately obvious when fabricated as lightguide grooves; but thin connections between lightguide rods arranged alongside each other can also exist when configured as lightguide rods.

In one variant of the invention, the lightguide rods originate at the lightguide parts outside of the beam splitting area and are configured so that they run in the direction of the light output area in the shadow region of the beam splitting area. The shadow region is situated, looking in the incoming beam direction, behind the bifurcation element (if present). The lightguide rods or lightguide grooves thus also extend into the zone of the connection element shaded by the beam splitting area and ensure a homogeneous light distribution at the light output area of the lightguide element. This prevents the light source from being perceived as a bright spot of intensity, which is an especially frequent problem when using light-emitting diodes.

Advantageously, the structuring elements have a prismatic structure. The prismatic structure is configured in known manner and deflects the beams arriving from the beam splitting area into the connection element or into the substrands fashioned there (lightguide rods or grooves). From here, the light then goes into the light output area and is beamed out. By suitable shaping of this prismatic structure the light can already be prehomogenized. Parameters of the prismatic structure which can be adapted include the density and/or number and/or depth and/or width of the prisms.

A further influencing of the light distribution can be accomplished when the lightguide parts have different cross sectional diameters. The light distribution can then be controlled, for example, by providing the first lightguide part with a greater cross sectional diameter than the second one or vice versa.

For better positioning of the lightguide element, at least one feed element is provided between the light input area and the beam splitting area. Advantageously, the feed element is configured as a lightguide. In this way, it is possible to position light source and lightguide element fully independently of each other, since the light of the light source [goes?] across the feed element into the beam splitting area. Thus, the lightguide element has very diverse uses.

In one variant of the invention, the light input area, the beam splitting area and the lightguide parts are configured as single pieces. Moreover, the connection element and the light output area can be configured as single pieces. In another variant of the invention, the light input area, the beam splitting area, the lightguide parts, the connection element and the light output area are configured as single pieces.

In order to facilitate the assembly of the lightguide element according to the invention, interlocking and/or referencing elements are provided on the lightguide element in the region of the light input area for the assembly of the lightguide element. For example, if the lightguide element is to be connected to a light source module by which the light comes in, a firm and at the same time detachable fixation can be assured by these interlocking and/or referencing elements, which at the same time allows for an optimal positioning of the lightguide element in regard to the light sources. Accordingly, corresponding fixation elements will be provided in known fashion on the light source module (or the object with which the lightguide element should be connected). The interlocking and/or referencing elements furthermore serve as centering and likewise referencing elements, i.e., to ensure that the lightguide element can be assembled in reproducible manner so that the desired light function is assured, or the required light distribution is beamed out.

Furthermore, the outgoing quantity of light can be increased or the light-emitting surface and/or the illuminated surface can be enlarged according to one variant of the invention by providing at least one additional light output area in the light output area. Advantageously, for this at least one shell element open in the beam direction is provided in the light output area, on whose side facing away from the light input area the additional light output area is arranged. Advantageously, a first shell element with a first additional light output area and a second shell element with a second additional light output area are provided.

The aforementioned problem is furthermore solved, according to the invention, by an aforementioned light unit or an automotive headlight, wherein at least one lightguide element is provided for the putting in of light from at least one light source. The automotive headlight serves, for example, to create a light function such as a position light, a daytime running light (DRL), or a blinking light.

If one wishes to create, e.g., a position light or DRL, one requires white light; for a blinking light, yellow light. If, now, one combines these light functions in a single lightguide system, one will need either a light source that provides both colors or two different LEDs, which can then be switched arbitrarily. Accordingly, according to one variant of the invention, the light source module is designed to bring in multicolored light to the lightguide element. This can be realized either by providing several light sources or by a single light source that can put out light in multiple colors. Thus, depending on the desired light function, one can arbitrarily bring in either white and/or yellow light.

Advantageously, the light source module (or its light sources) can be dimmed. This means that the light sources arranged in it can be dimmed and can change in their intensity. In this way, one can realize different light intensities, such as are required in the different law codes.

In one variant of the invention, at least one LED chip is provided in the light source module. Such light sources are familiar; of course, any other light sources known to the skilled person can be used.

BRIEF DESCRIPTION OF THE DRAWINGS

The invention shall be explained more closely hereafter by means of a nonlimiting sample embodiment that is depicted in the drawing. This shows schematically.

DETAILED DESCRIPTION

Figure 1:
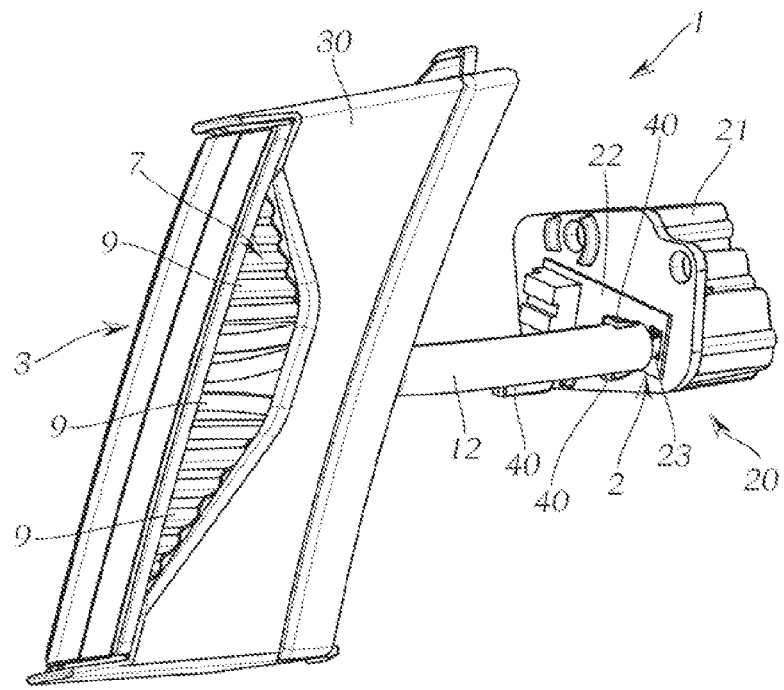
FIG. 1, a perspective view of a lightguide element according to the invention from the front at a slant, with face plate, FIG. 2, a perspective view of a lightguide element according to the invention from the front at a slant, without face plate, FIG. 3, a perspective view from the side, FIG. 4, a perspective view from behind at a slant, FIG. 5, a sectional view of the connection element of the lightguide element along line A-A of FIG. 3, and FIG. 6, a side view of one variant of the lightguide element of the invention.

FIG. 1 shows a lightguide element 1 according to the invention in a slanting view from the front. The lightguide element 1 is made, for example, from lightguiding plastic, glass, or other lightguiding materials, in the injection molding process, for example. Light from at least one light source, such as a light-emitting diode (LED), is brought in through a light input area 2 and leaves again through a light output area 3. The light sources, LED chips 23 in the present example, are arranged in the light source module 20 on a circuit board 22 with corresponding contacting. For example, corresponding plug-in connections can be provided in the circuit board 22 for the fixation of the LED chips 23. The light source module 20 furthermore comprises a heat dissipator 21 to take away the heat produced by the operation of the LED chips 23.

Basically at least one light source is needed, but it can be advantageous to provide several different light sources (or one light source that can provide several colors) in order to cover a broader spectrum of light functions. For example, one needs white light for a position light and/or DRL (daytime running light), for a blinking light one needs yellow light. These two functions can thus be combined in a single lightguide system either with one LED chip 23 or several LED chips which are then switched accordingly.

Advantageously, the light sources can be dimmed, so that the different light intensities according to the aforementioned law codes can be achieved.

The lightguide element of the invention can be used together with such a light source module 20 in a lighting unit or in an automotive headlight.

Figure 3:
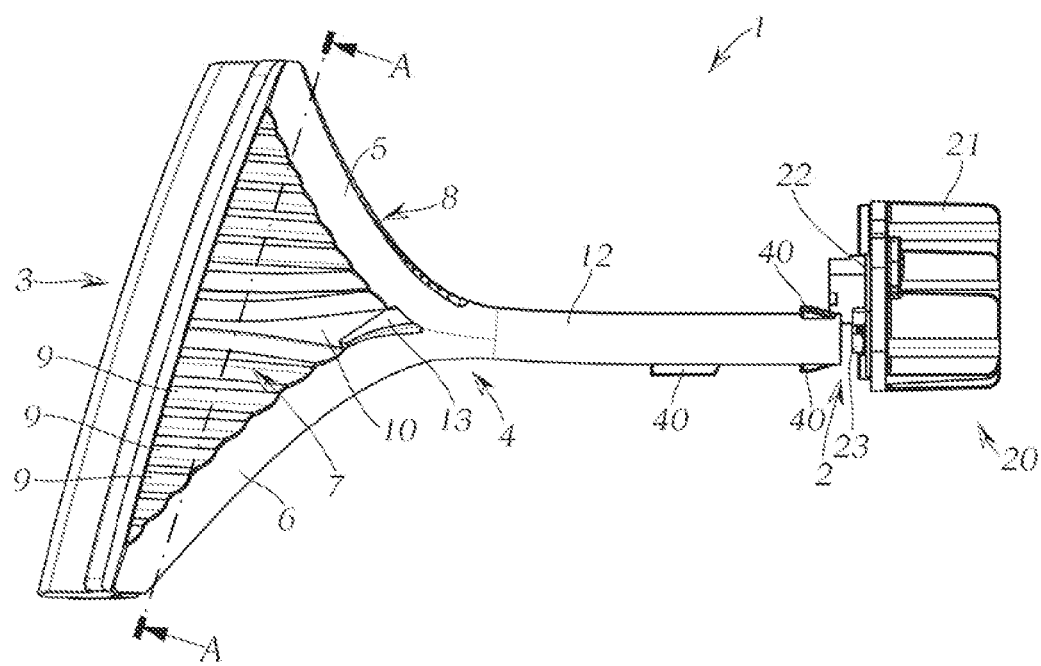
Figure 4:
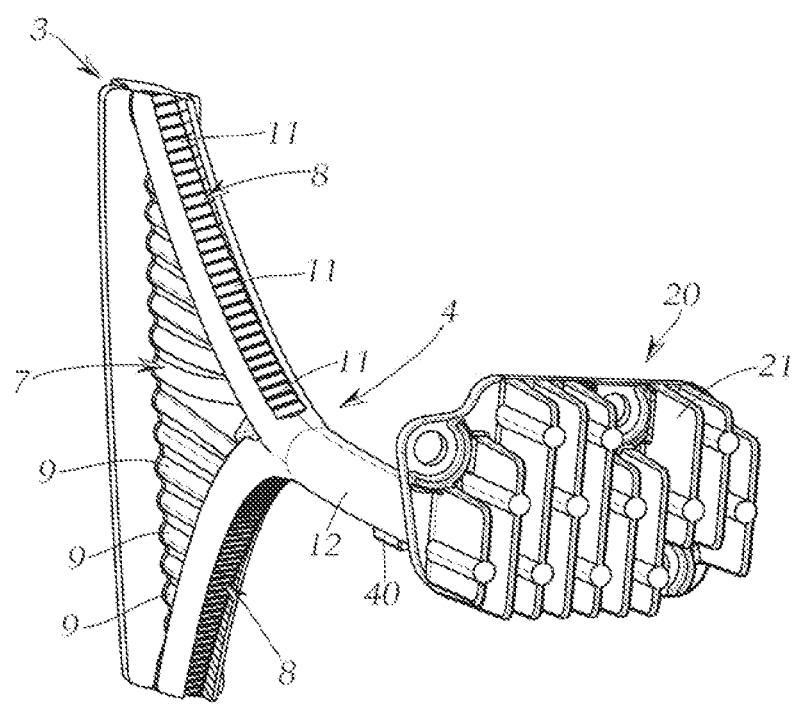

In FIG. 1, most of the lightguide element 1 is surrounded by a face plate 30. This serves to minimize the emergence of stray light, caused by microscopic surface flaws or the like on the lightguide element, and thus assure a homogeneous light distribution. This, furthermore, prevents the light from emerging at unwanted locations or being reflected in the headlight system. The elements of the lightguide element 1 described hereinafter are identifiable in FIG. 2 to FIG. 4.

Between the light input area 2 and the light output area 3 there is arranged a beam splitting area 4, where the part of the lightguide element 1 coming from the light input area 2 is divided into a first 5 and a second lightguide part 6, which run in directions leading away from each other.

According to one variant, a bifurcation element 13 (see FIG. 3) can be provided in the beam splitting area 4 at the place from which the lightguide parts 5, 6 proceed. The bifurcation element 13 is optically thinner than the rest of the lightguide element 1, for example, it is made of air, i.e., as an opening or pierced spot. Another variant would be a heavily thinned spot of the lightguide element 1, where an optically thinner region is approximated by the combination of a thinner elemental layer and air as the remaining part of the bifurcation element 13. It would also be possible to design it from optically thinner material different from the rest of the lightguide element 1.

In order to arrange the light output area 3 however one chooses in relation to the light input area 2 or the light source, in the present sample embodiment a feed element 12 in the form of a lightguide is provided between the light input area 2 and the beam splitting area 4. As can be seen from the side view of FIG. 2, the feed element 12 in the sample embodiment depicted is short and straight, but it can also be longer and winding.

On the lightguide element 1, preferably on the feed element 12 (or generally speaking near the light input area 2), interlocking and/or referencing elements are provided, with which the lightguide element 1 can be installed in its intended location. The interlocking and/or referencing elements are designed, for example, as locking lugs that interact with corresponding elements at the place of use (e.g., the light source module 20) of the lightguide element 1. This connection can be detachable, in keeping with the customary design of locking connections. At the same time, the interlocking and/or referencing elements 40 serve for referencing, that is, for reproducible assembly of the lightguide element 1.

The interlocking and referencing elements 40 are in principle identical in configuration, but they can also serve on the one hand for fixation by interacting with a corresponding mating piece on the light unit, and on the other hand for referencing without a corresponding mating effect, i.e., for (reproducible) assurance of the desired light distribution.

Figure 2:
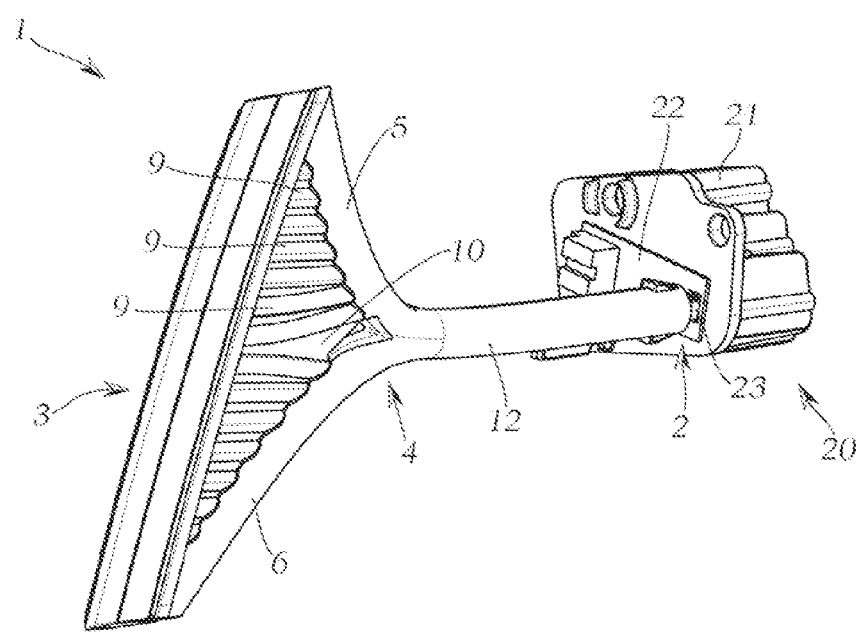

As is evident from FIG. 2, the lightguide parts 5, 6 run in directions leading away from each other —basically they can subtend an angle of up to 180°. The lightguide parts 5, 6 do not travel in straight lines, but rather in curves—thus, the angle between the lightguide parts 5, 6 is to be understood either as the angle which straight-line connections subtend between the beam splitting area 4 and the end point of the respective lightguide part 5, 6, or the angle between the tangents to the lightguide parts 5, 6 at particular points.

The trend of the lightguide parts 5, 6 can be chosen according to the available design space and the size of the subtended range. One should make sure that the curvature of the lightguide parts 5, 6 neither allows a total reflection of the incoming light nor results in excessive losses of light. Basically, the skilled person can find instruction as to the configuration of the lightguide parts 5, 6 from the above information.

In the area subtended by the lightguide parts 5, 6 there is arranged a lightguiding connection element 7, which transitions into the light output area 3 on its side facing away from the lightguide parts 5, 6.

Figure 5:
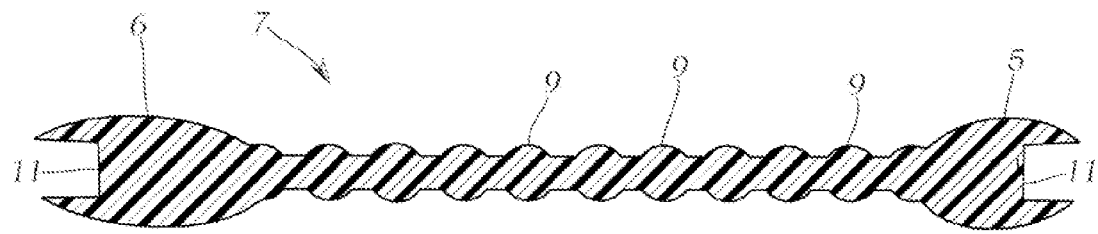

The lightguiding connection element 7 has, for example, a fan-shaped infeed with substrands, which arise from the lightguide parts 5, 6 and emerge into the light output area 3. In the sample embodiment shown, the substrands are configured as lightguide rods 9. FIG. 5 shows a section through the lightguide element 1 of FIG. 3 along line A-A—between the lightguide parts 5, 6 one recognizes the connection element 7 with the lightguide rods 9.

The cross sections of the lightguide parts 5, 6 and also those of the individual lightguide rods 9 in the sample embodiment shown basically have the same diameter. But in order to influence the light distribution, one can also select different diameters here. For example, the diameters of the lightguide rods 9 can differ across the connection element 7, e.g., they can increase or decrease. In order to create a maximum in the light distribution, the roughly centrally situated lightguide rods 9 can be thicker or broader. Moreover, individual lightguide rods 9 can be designed with increasing and/or decreasing diameters along their length or have other changes in cross section along their trend. For example, a lightguide rod 9 can have a narrow diameter at the point of its origin on the lightguide part 5, 6, which then increases in the direction of the light output area 3.

A change in the light distribution can also be accomplished by varying the cross section diameters of the lightguide parts 5, 6, e.g., by having the diameter of the first lightguide part 5 be larger than the diameter of the second lightguide part 6.

Of course, the connection element 7 can also be made otherwise lightguiding by a different design of the substrands, for example, by providing lightguide grooves, combinations of grooves and rods, and similar solutions known to the skilled person. The substrands can also have connections with each other, which is obvious, for example, when configured as lightguide grooves. But also when configured as lightguide rods, connections can also exist between neighboring rods, which can be dictated by the manufacturing process, for example. The cross sections of the substrands can be circular, or also in theory polygonal or angular or configured in a different way. With an angular design, losses of light can occur at the corners and edges, so that the round or oval shape is preferable.

The orientation of the substrands or lightguide rods 9 defines the direction of the principal beam of the overall lightguide element 1 and can therefore be configured to suit the area of application. The lightguide rods 9 are designed such that they run in the direction of the light output area 3, even in the shadow zone 10 of the beam splitting area 4. In the beam splitting area 4, the part of the lightguide element 1 coming from the light input area 2 is completely divided into the lightguide parts 5, 6—in this way, a shaded part is produced behind the beam splitting area 4.

On the one hand, this has the advantage of preventing an increased intensity of light in the area where the light source is coupled to the lightguide element 1—if a light-emitting diode is used, a massively increased circular intensity of light may occur, which disrupts the homogeneous luminance of the lightguide element 1. On the other hand, however, the shaded part in turn produces a disruption in the luminance, which is remedied by the above-described design of the substrands (lightguide rods 9).

Therefore, the lightguide rods 9 are configured so that they originate outside the beam splitting area 4 and run in the direction of the light output area 3, curving into the shadow zone of the beam splitting area 4. The lightguide rods 9 therefore emerge uniformly into the light output area 3, so that a homogeneous luminance of the lightguide element 1 is achieved.

The light brought in at the light input area 2 goes via the feed element 2 (if present) to the beam splitting area 4, where the light is directed into the lightguide parts 5, 6. Thanks to optical structuring elements 8 (see FIG. 3) in the lightguide parts 5, 6, the light is then directed into the connection element 7 or the lightguide rods 9 and from here it exits once more through the light output area 3.

The optical structuring elements 8 are arranged on the side of the lightguide parts 5, 6 away from the light output area 3. The structuring elements 8 are configured as a prismatic structure 11—i.e., a row of prisms; other configurations are also possible to conduct the light accordingly into the connection element 7. Thanks to suitable shaping of this prismatic structure 11, the light can already be prehomogenized. Adjustable parameters of the prismatic structure 11 are, for example, the number and/or depth and/or width of the prisms.

Figure 6:
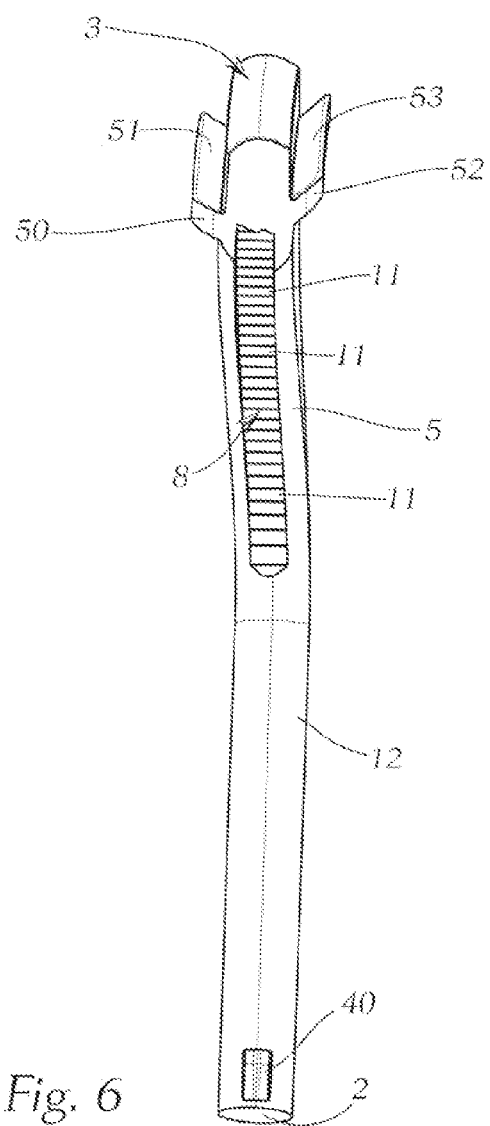

The light output area 3 is designed with a smooth surface according to the embodiment shown, which is often of advantage for design reasons. But the light output area 3 can also be configured otherwise, for example, in order to accomplish a greater light efficiency, to increase the illuminated area or the light-emitting area—FIG. 6 shows one such variant in which a lightguide element 1 according to the invention is seen from the side (this view corresponds to a top view in the assembled state). Two additional light output areas 51, 53 are provided in the light output area 3, being configured as shell elements 50, 52 open in the beam direction, on whose side facing away from the light input area 2 the additional light output areas are arranged. The first shell element 50 with the first additional light output area 51 and the second shell element 52 with the second additional light output area 53 are arranged on opposite sides of the lightguide element 1.

The providing of the additional light output areas 51, 53 increases the illuminated area, which is beneficial for reasons of better visibility (e.g., in the case of daytime running lights). The illuminated area is dictated by law for certain light distributions and may not be lower than a limit amount.

The additional light output areas 51, 53 can be configured with a smooth surface, but can also have an additional structuring in order to enlarge the light-emitting surface or influence the quantity of light put out through these areas.

Advantageously, the entire lightguide system 1 is designed as a single piece; thus, light input area 2, beam splitting area 4, lightguide parts 5, 6, connection element 7 and light output area 3 form a single unit. Alternatively, only the light input area 2, beam splitting area 4, and lightguide parts 5, 6 are configured as single pieces, or only the connection element 7 and light output area 3.

LIST OF REFERENCE SYMBOLS

1 lightguide element
2 light input area
3 light output area
4 beam splitting area
5 first lightguide part
6 second lightguide part
7 connection element
8 structuring element
9 lightguide rod
10 shadow region
11 prismatic structure
12 feed element
13 bifurcation element
20 light source module
21 heat dissipator
22 circuit board (with contacting)
23 LED chip
30 face plate
40 interlocking or referencing element
50 first shell element
51 first additional light output area
52 second shell element
53 second additional light output area

What is claimed is:

1. A light guide element (1) for a lamp unit or an automotive headlight comprising:
   at least one light input area (2) for putting in light with at least one light source; and
   at least one light output area (3) for emitting the light, wherein:
   a beam splitting area (4) is arranged between the light input (2) and the light output area (3), where the part of the light guide element (1) coming from the light input area (2) is divided into at least one first light guide part (5) and at least one second light guide part (6), which travel in directions leading away from each other,
   a light guiding connection element (7) is arranged in the area spanned by and between the light guide parts (5, 6), which transitions into the light output area (3) on its side facing away from the light guide parts (5, 6), and the light guide parts (5, 6) have optical structuring elements (8) on their side facing away from the light output area (3), and
   substrands are provided in the connection element (7) that arise from the light guide parts (5, 6) and emerge into the light output area (3).

2. The light guide element of claim 1, wherein at least one bifurcation element (13) is provided in the beam splitting area (4) at the place from which the light guide parts (5, 6) proceed.

3. The light guide element of claim 2, wherein the bifurcation element (13) is optically thinner than the rest of the light guide element.

4. The light guide element of claim 1, wherein the cross sections of the substrands are configured with different diameters.

5. The light guide element of claim 1, wherein the substrands are configured as light guide rods (9) and/or as light guide grooves.

6. The light guide element of claim 5, wherein the light guide rods (9) and/or light guide grooves originate at the light guide parts (5, 6) away from/outside of the beam splitting area (4) and are configured so that they run in the direction of the light output area (3) in a shadow region (10) of the beam splitting area (4).

7. The light guide element of claim 1, wherein the structuring elements (8) have a prismatic structure (11).

8. The light guide element of claim 1, wherein the light guide parts (5, 6) have different cross sectional diameters.

9. The light guide element of claim 1, wherein at least one feed element (12) is provided between the light input area (2) and the beam splitting area (4).

10. The light guide element of claim 9, wherein the feed element (12) is configured as light guide.

11. The light guide element of claim 1, wherein the light input area (2), the beam splitting area (4) and the light guide parts (5, 6) are configured as single pieces.

12. The light guide element of claim 1, wherein the connection element (7) and the light output area (3) are configured as single pieces.

13. The light guide element of claim 1, wherein the light input area (2), the beam splitting area (4), the light guide parts (5, 6), the connection element (7) and the light output area (3) are configured as single pieces.

14. The light guide element of claim 1, wherein interlocking and/or referencing elements (40) are provided on the light guide element (1) in the region of the light input area (2) for the assembly of the light guide element (1).

15. The light guide element of claim 1, wherein at least one additional light output area (51, 53) is provided in the light output area.

16. The light guide element of claim 15, wherein at least one shell element (50, 52) open in the beam direction is provided in the light output area (51, 53), on whose side facing away from the light input area (2) the additional light output area (51, 53) is arranged.

17. The light guide element of claim 16, wherein a first shell element (50) with a first additional light output area (51) and a second shell element (52) with a second additional light output area (53) are provided.

18. A light unit or automotive headlight comprising:
at least one light source module (20); and
at least one light guide element of claim 1 for the putting in of light from the at least one light source module (20).

19. The light unit or automotive headlight of claim 18, wherein the light source module (20) is designed to bring in multicolored light to the light guide element (1).

20. The light unit or automotive headlight of claim 18, wherein the light source module (20) is configured to be dimmed.

21. The light unit or automotive headlight of claim 18, wherein at least one LED chip (23) is provided in the light source module (20).

* * * * *

UNITED STATES PATENT AND TRADEMARK OFFICE
CERTIFICATE OF CORRECTION

| | | |
|---|---|---|
| PATENT NO. | : 9,039,260 B2 | Page 1 of 1 |
| APPLICATION NO. | : 13/670048 | |
| DATED | : May 26, 2015 | |
| INVENTOR(S) | : Anton Faffelberger | |

It is certified that error appears in the above-identified patent and that said Letters Patent is hereby corrected as shown below:

On the title page, under Item (73) Assignee, please change "Wieselburg (AU)" to -- Wieselburg (AT) --

IN THE SPECIFICATION

Column 1, line 15, please change "such a" to -- such as --

Column 7, line 23, please change "feed element 2" to -- feed element 12 --

Signed and Sealed this
Twentieth Day of October, 2015

Michelle K. Lee
*Director of the United States Patent and Trademark Office*